United States Patent [19]
Roote et al.

[11] Patent Number: 4,944,574
[45] Date of Patent: Jul. 31, 1990

[54] STAND MAGNIFIER AND LENS

[75] Inventors: Robert J. Roote, High Wycombe; Ian K. Pasco, Warfield; Ian J. Smithers, Taplow; Paul J. Fisher, Slough, all of England

[73] Assignee: Combined Optical Industries Limited, Berkshire, England

[21] Appl. No.: 149,280

[22] Filed: Jan. 28, 1988

[30] Foreign Application Priority Data

Jan. 28, 1987 [GB] United Kingdom ............... 8701880

[51] Int. Cl.⁵ .................. G02B 25/00; G02B 3/02
[52] U.S. Cl. ................................ 350/245; 350/247; 350/432
[58] Field of Search .............. 350/245, 246, 247, 432, 350/433, 434, 435, 571, 241, 252, 235, 236, 237

[56] References Cited

U.S. PATENT DOCUMENTS

| | | | |
|---|---|---|---|
| D. 168,546 | 1/1953 | Igler et al. ............ | 350/235 |
| 1,044,814 | 11/1912 | Peterson ............... | 350/246 |
| 1,463,624 | 7/1923 | Mabee .................. | 350/236 |
| 1,557,605 | 10/1925 | O'Meara ................ | 350/245 |
| 1,711,768 | 5/1929 | Bausch et al. ......... | 350/245 |
| 1,804,105 | 5/1931 | Martens ................ | 350/237 |
| 2,345,416 | 3/1944 | Naramore .............. | 350/236 |
| 2,388,476 | 11/1945 | Esdaile ................ | 350/235 |
| 2,604,009 | 7/1952 | Walrath ................ | 350/241 |
| 2,861,501 | 11/1958 | Strelakos .............. | 350/235 |
| 3,428,286 | 2/1969 | Del Pesco ............. | 350/245 |
| 3,628,871 | 12/1971 | Himmelstrup ........... | 350/235 |
| 4,348,081 | 9/1982 | Betensky ............... | 350/432 |
| 4,606,607 | 8/1986 | Kurihara ............... | 350/432 |
| 4,641,929 | 2/1987 | Braat .................. | 350/432 |

Primary Examiner—Bruce Y. Arnold
Assistant Examiner—Martin Lerner
Attorney, Agent, or Firm—Scrivener and Clarke

[57] ABSTRACT

The invention discloses a bi-convex lens having aspheric surfaces, each of substantially identical curvature. The lens may be used in a stand magnifier which comprises a stand adapted to be supported on a surface and to which is attached or attachable such a magnifying lens. At least part of the stand and the lens is tiltable with respect to the surface in either direction from a position where the lens is parallel to the surface, preferably through an angle of up to 20°.

7 Claims, 2 Drawing Sheets

STAND MAGNIFIER AND LENS

The present invention relates to a stand magnifier and also to a lens for use, inter alia, therewith.

It is a regrettable fact that low vision is not uncommon. For people with low vision, reading may be impossible or at least extremely difficult even with such aid as may be given them by the use of spectacles. Often, they need to resort to the use of a magnifier in order to be able to read easily. Most commonly used is a hand-held magnifying glass. However, low vision affects mainly the elderly, some of whom may be too frail to hold a magnifying glass in the correct position for any length of time. Furthermore, the lenses of many such magnifying glasses will only give a readable image if they are held in exactly the right place all the time.

In an attempt to overcome the above problems, stand magnifiers have become available where the lens is held a predetermined height above the object to be viewed. This arrangement ensures that the lens is the correct distance from the object and also eases any strains on the arm of the user. However, stand magnifiers have hitherto, in the main, had the lens arranged parallel to the object. Thus, in order to use the stand magnifier, the user has to lean over the magnifier to look vertically downwards. This is difficult enough at the best of times, but for the elderly, it is even more uncomfortable. The alternative is to tilt the object and therefore the stand magnifier to an angle where viewing is comfortable. This is not always easy and may mean that the magnifier must be held all the time to prevent it slipping down the slope.

Where a user is free to align the lens, as in the case of a hand-held magnifying glass, it is usual to do so along a plane bisecting the angle subtended by the plane of the object being viewed and a plane at right angles to the line of sight. Such an angle gives a comfortable viewing position and reasonably distortion free image.

Attempts have been made to overcome the problems associated with hitherto known stand magnifiers by providing them with a lens permanently angled in this optimum region. However, this arrangement still imposes a viewing angle on the user, albeit a more comfortable viewing angle. It does not however suit every user, whose ideas of a comfortable viewing position may differ considerably. Furthermore, many stand magnifiers are provided with illumination directed toward the object being viewed, and a battery case with on/off switch to one side. In every known case of such fixed angle stand magnifiers, this suits right-handed users but makes the magnifier totally unusable by left-handed people since the lens is in fact tilted away from them.

Lenses hitherto used in magnifiers have generally been of spherical type. One problem with spherical lenses is that a true image is given only over a portion of the lens surface. If the centre is perfectly in focus, there will be distortion at the edges. This problem can be overcome by using an aspheric lens but hitherto such lenses, when of the finite conjugate type as used in magnifiers, have had the opposite surfaces following different equations. Such a lens can give a perfect image in one direction, but will give a distorted image when viewed from the other side. Thus, in the case of hand-held magnifiers, it is quite possible for them to be held the wrong way up and thereby give poor results.

It is an object of the present invention to provide a stand magnifier which overcomes the above disadvantages and also to provide a lens which can be viewed from either side.

According to a first aspect of the present invention there is provided a bi-convex lens having aspheric surfaces, each of substantially identical curvature.

Preferably the lens surfaces have a mathematical form which is an equation of a conic section, optionally including irregularity coefficients up to the 20th order. Advantageously the surfaces are hyperbolic.

The lens may be a finite conjugating lens, optionally for use with the stand magnifier of the second aspect of the invention.

According to a second aspect of the present invention there is provided a stand magnifier comprising a stand adapted to be supported on a surface and to which is attached or attachable a magnifying lens, at least part of the stand and the lens being tiltable with respect to the surface in either direction from a position where the lens is parallel to the surface.

Preferably the stand and lens may be tilted through an angle of up 20°, advantageously between 10° and 15°.

The tilting may be about a point close to the focus of the lens. Preferably, within certain limits of tilting, the lens is maintained substantially at its optimum working distance from an object zone of the surface.

An upper part of the stand, and the lens fixed thereto, may be pivoted to a lower part of the stand to permit the tilting action.

Alternatively, the lower surface of the stand may comprise three or more surfaces, angles one to the next, the stand being able to be stood on any one of the surfaces. The lens used with the stand magnifier is preferably one in accordance with the first aspect of the present invention.

Embodiments of the present invention will now be more particularly described by way of example and with reference to the accompanying drawings, in which.

Figure 1:
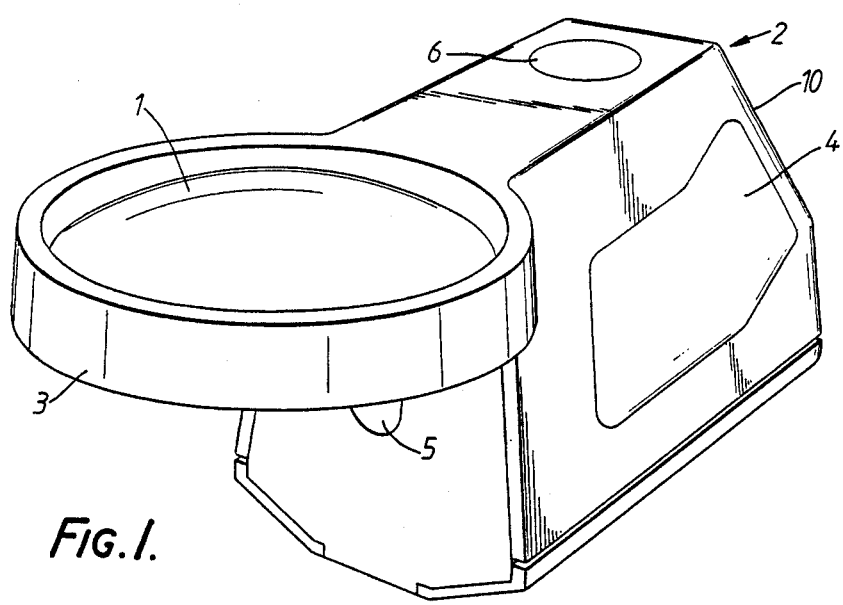
FIG. 1 is a perspective view of a stand magnifier embodying the invention.
Figure 2:
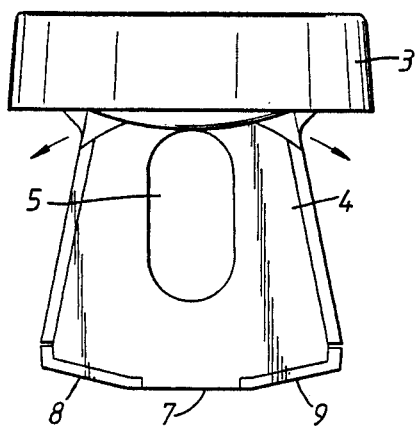
FIG. 2 is a side elevation of the magnifier of FIG. 1.

Referring now to the drawings, there is shown in FIGS. 1 and 2 an illuminated magnifier having a lens 1 of the type to be described in more detail below, mounted to a stand 2. The stand comprises a lens holder 3 and a body 4, which body 4 is adapted to contain batteries to power a light 5 which is disposed to illuminate a zone of the surface below the lens 1. The light is controlled by means of a push switch 6.

The base of the body 4 comprises three surfaces 7, 8 and 9. As can be seen more clearly in FIG. 2, outer surfaces 8 and 9 are angled upwardly with respect to central surface 7 by an angle in the region of 10°. Normally, the weight of the body 4 maintains the magnifier resting on central surface 7, so that the lens 1 is parallel to the surface. In order to achieve more comfortable viewing, the user need only grip the magnifier lightly in whichever hand is most convenient or comfortable, and tilt the magnifier towards himself so that it then rests on either of surfaces 8 or 9.

As an alternative, the rear face 10 of body 4 is so angled that the magnifier can be stood on this surface. Provided the lens is of the type described below, the magnifier will be usable, although the light cannot be used.

Figure 3:
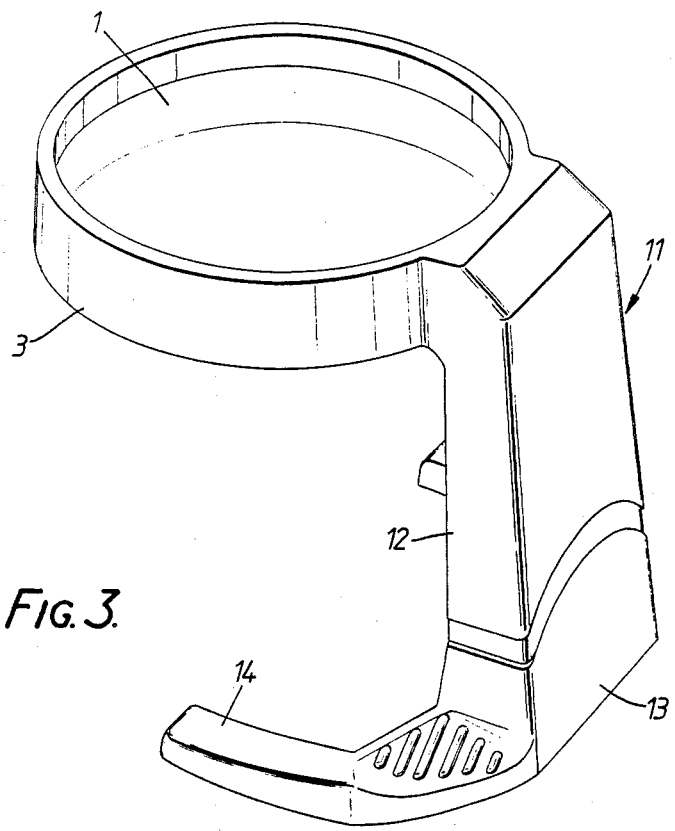
FIG. 3 is a perspective view of a second type of magnifier embodying the invention.
Figure 4:
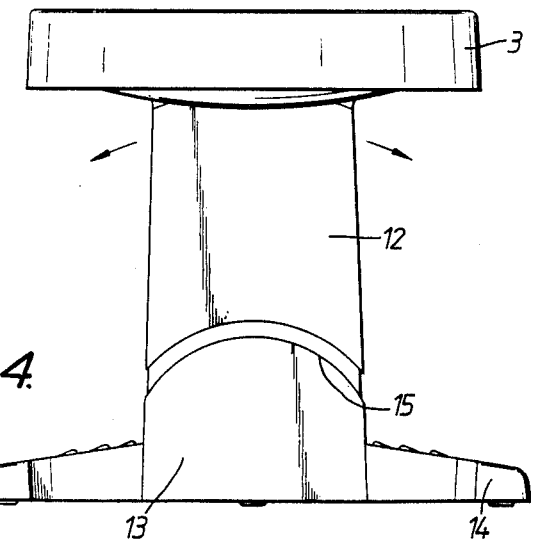
FIG. 4 is a side elevation of the magnifier of FIG. 3.

A second type of magnifier is shown in FIGS. 3 and 4. In this case, lens 1 is fixed in a stand 11 which comprises a lens holder portion 3, an upright portion 12, and a base portion 13. Base portion is provided with stabilising legs 14 extending partially around the zone to be viewed. An upper edge 15 of the lower portion 13 is curved in the direction of tilting and engages a lower end of the upright portion 12.

The upright portion 12 and the lens 1 carried thereby are free to pivot under gentle pressure in the direction of either of the arrows, and following the line of curved upper edge 15. The angle of tilting is limited to approximately 15° and it may be held at any desired angle within this range by frictional engagement within the lower portion 13.

The lens used with the above magnifiers, and also with other magnifiers and for other purposes, is bi-convex and both surfaces are asymmetric following the same mathematical curve of conic section.

The lens may be made of glass, allyl diglycol carbonate, polystyrene, polycarbonate, polyolefin, or preferably polymethylmethacrylate, or any copolymer thereof.

Because of the symmetrical character of the lens, it can withstand up to 20° axial tilt about the working distance without introducing abberation beyond an acceptable level.

The lens can be made to give any desired magnification up to the limit of about X12 and is ideally suited to the above stand magnifiers and hand-held magnifiers, although many other uses can be foreseen.

The lens curves used for the lenses are described by the equation:

$$Z = \frac{(Y^2/R_v)}{1 + (1 - (PY^2/R_v^2))^{\frac{1}{2}}} + D \cdot Y^4 + E \cdot Y^6 + F \cdot Y^8 + G \cdot Y^{10}$$

where $R_v$ is vertex radius, P is eccentricity and D,E,F and G are irregularly coefficients.

The following Table shows four examples of curves that may be used, although others of the same general form may also be used.

| Magnification | 3× | 4× | 6× | 8× |
|---|---|---|---|---|
| $R_v$ | 125.1 mm | 88.00 mm | 49.75 mm | 37.3 mm |
| P | −1.57221458 | −1.82486208 | −4.18338875 | −1.81527349 |
| D | $1.63479568 \times 10^{-08}$ | $6.67861581 \times 10^{-08}$ | $2.81559027 \times 10^{-06}$ | $1.19597867 \times 10^{-06}$ |
| E | $-9.10638588 \times 10^{-12}$ | $-1.64729656 \times 10^{-11}$ | $-3.04654969 \times 10^{-09}$ | $-1.52320614 \times 10^{-09}$ |
| F | $2.75818565 \times 10^{-15}$ | $3.00173837 \times 10^{-15}$ | $2.44574797 \times 10^{-12}$ | $1.2772338 \times 10^{-12}$ |
| G | $-2.64556134 \times 10^{-19}$ | $-3.59108280 \times 10^{-19}$ | $-9.83453167 \times 10^{-16}$ | $-4.82789568 \times 10^{-16}$ |

What we claim is:

1. A stand magnifier comprising a stand adapted to be supported on a surface, said surface having an object zone to be magnified by said magnifier, a magnifying lens of predetermined focal length fixed to a part of said stand, at least said part of the stand and the lens fixed thereto being tiltable together to a predetermined angular extent with respect to the surface in either direction from a position where the lens is parallel to the surface and about a point separated from the lens by a distance close to the focal length of the lens, whereby the lens is maintained substantially at its optimum working distance from said object zone of the surface, said lens being a bi-convex lens having aspheric surfaces, each of substantially identical curvature.

2. A magnifier as claimed in claim 1, wherein said lens surfaces have a mathematical form which is an equation of a conic section, including irregularity coefficients up to the 20th order.

3. A magnifier as claimed in claim 2, wherein the lens surfaces are hyperbolic.

4. A magnifier as claimed in claim 1 wherein the stand and lens are tiltable through an angle of up to 20°.

5. A magnifier as claimed in claim 4, wherein an upper part of the stand, and the lens fixed thereto, are pivoted to a lower part of the stand to permit said upper part to be tiltable with respect to said surface.

6. A magnifier as claimed in claim 4 wherein said stand has a lower surface comprising three mutually angled flat faces the stand being able to be stood on any one of said three faces.

7. A stand magnifier comprising a stand having a lower surface comprising a central flat face and two edge flat faces each angled to said central face by an angle of up to 10°, the stand being able to be stood on a supporting surface upon any one of said flat faces, and a magnifying lens of predetermined focal length fixed to said stand at a distance from an object zone of the said supporting surface which substantially equals the predetermined focal length.

* * * * *